United States Patent [19]

Kobayashi

[11] Patent Number: 5,079,990
[45] Date of Patent: Jan. 14, 1992

[54] HYDRAULIC PRESSURE BOOSTER

[75] Inventor: Michio Kobayashi, Higashimatsuyama, Japan

[73] Assignee: Jidosha Kiki Co., Ltd., Tokyo, Japan

[21] Appl. No.: 386,164

[22] Filed: Jul. 28, 1989

[30] Foreign Application Priority Data

Aug. 3, 1988 [JP] Japan .................. 63-102408[U]

[51] Int. Cl.⁵ .................. F15B 9/10; F15B 21/10; B60T 13/12
[52] U.S. Cl. .................. 91/369.1; 91/374; 91/393; 60/548
[58] Field of Search .................. 60/547.1, 548; 91/368, 91/369.1, 376 R, 393, 374

[56] References Cited

U.S. PATENT DOCUMENTS

| | | | |
|---|---|---|---|
| 3,796,134 | 3/1974 | Kaptrosky | 60/548 X |
| 3,926,092 | 12/1975 | Myers | 60/548 X |
| 4,161,867 | 7/1979 | Adachi | 60/547.1 |
| 4,514,981 | 5/1985 | Brown et al. | 60/547.1 |
| 4,642,990 | 2/1987 | Mizusawa et al. | 91/376 R X |
| 4,656,923 | 4/1987 | Tsuyuki et al. | 91/369 R |
| 4,685,297 | 8/1987 | Brown | 60/547.1 |
| 4,773,223 | 9/1988 | Mizusawa et al. | 91/376 R X |
| 4,781,026 | 11/1988 | Kiromitzu | 60/547.1 |
| 4,819,433 | 4/1989 | Belart | 60/547.1 |
| 4,876,853 | 10/1989 | Shirai et al. | 60/547.1 |
| 4,920,857 | 5/1990 | Horiuchi et al. | 60/547.1 X |
| 4,967,560 | 11/1990 | Konishi | 91/376 R X |

Primary Examiner—Edward K. Look
Assistant Examiner—John Ryznic
Attorney, Agent, or Firm—Varndell Legal Group

[57] ABSTRACT

The invention relates to a hydraulic pressure booster which can be used to perform servo control of input and output at the preset servo ratio in, for example, a brake booster. In particular, the invention relates to a hydraulic pressure booster, which is designed to reduce the loss stroke of an input shaft in the initial stage of operation. This can be achieved by providing a stopper which directly abuts the input shaft when it is non-operational and which maintains the input shaft at the preset advance position separated from the detent in relation to the power piston.

3 Claims, 1 Drawing Sheet

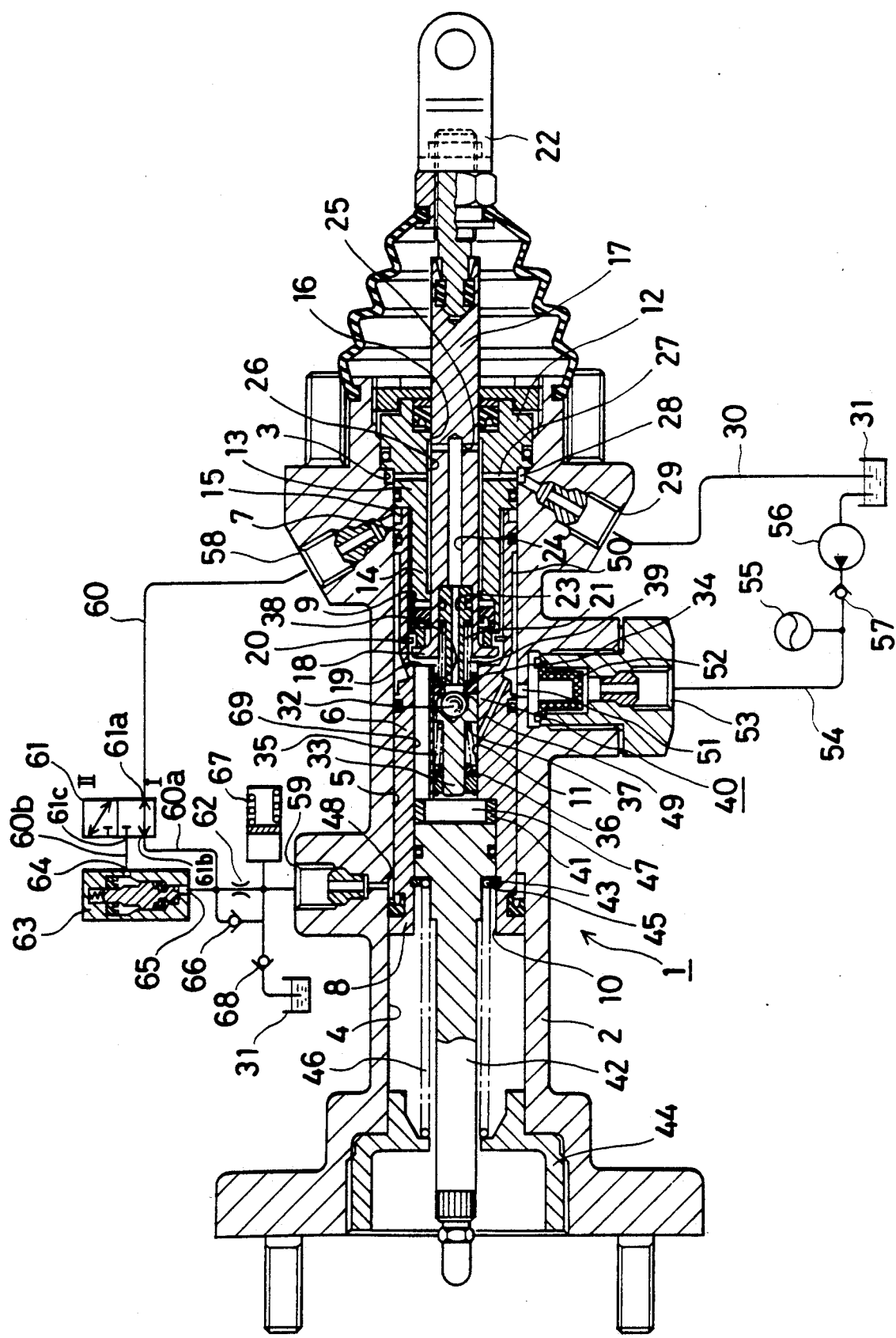

HYDRAULIC PRESSURE BOOSTER

BACKGROUND OF THE INVENTION

The present invention relates to a hydraulic pressure booster which is used to perform servo control of input and output at the preset servo ratio and is used in a brake booster or the like, and it particularly relates to a hydraulic pressure booster, which is designed to reduce the loss stroke of an input shaft in the initial stage of the operation.

In general, a hydraulic pressure booster consists of a power piston slidably engaged with the housing thereof, a power chamber, into which hydraulic pressure acting on one end of said power piston is introduced, a control valve to control and change over the communication between said power chamber and the hydraulic pressure source or reservoir, an input shaft to operate said control valve, and an output shaft connected with said power piston. By changing over the control valve through the operation of input shaft, hydraulic pressure from a hydraulic pressure source is introduced into the power chamber, and the power piston is operated by this hydraulic pressure to output the power from the output shaft. In such a case, the hydraulic pressure booster performs the so-called servo control, by which the output from the output shaft is controlled according to the input of the input shaft.

In such a hydraulic pressure booster, it is necessary to enlarge the area of the passage of the control valve communicating the hydraulic pressure source and the power chamber during operation and to expand the area of the passage of the control valve for the communication between the power chamber and reservoir when operation is released. In both cases, the opening of the control valve must be increased. However, if the opening of the control valve is increased, the displacement of the input shaft is increased, and much time is required from the initiation of the operation to the changeover of the passage of control valve. In other words, the loss stroke of the input shaft is increased in the initial stage of the operation.

In this respect, a hydraulic pressure booster was proposed in the U.S. Pat. No. 4,656,923, in which the responsiveness was improved by reducing the loss stroke of the input shaft.

In the hydraulic pressure booster described in this publication, the opening of the control valve is increased by extending the relative displacement of the power piston and the input shaft when the operation is released. During non-operation, the input shaft is maintained at the position advanced forward in relation to the power piston by a stopper means in order to bring the input shaft closer to the control valve. By this hydraulic pressure booster, the control valve is changed over immediately at the starting of the operation and the fluid is introduced into the power chamber and the power piston is quickly operated because input shaft is located very close to the control valve. When the operation is released, the fluid in power chamber is quickly discharged to the reservoir, and the power piston is quickly returned because the opening of the control valve is increased.

In order to control the backward movement of the input shaft in relation to the power piston, a detent is provided movable forward and backward in relation to the power piston so that the detent can be moved forth toward the control valve by the stopper means together with the input shaft during non-operation.

However, the degree of mounting freedom of such a detent is limited because it must positively hinder the input shaft from coming out of the power piston. When the degree of mounting freedom is limited in this way, the detent may not move positively. The lack of the positive movement of the detent may mean that the input shaft cannot be moved forward in relation to the power piston when the input shaft is not operated. This causes the problem that the loss stroke of the input shaft cannot be reduced.

If free movement is assured to actualize the positive movement of the detent, a new problem arises that the detent is separated from the power piston and loses its detent function.

SUMMARY OF THE INVENTION

The object of the present invention is to improve the responsiveness of the hydraulic pressure booster by reducing the loss stroke of the input shaft in the initial stage of the operation, while the detent function of the detent in the hydraulic pressure booster is maintained sufficiently.

In the present invention a power piston is slidably disposed within a housing and is operatively connected with an output shaft. A main power chamber is provided for applying fluid pressure to the power piston. The main power chamber is interconnected either with a source of fluid under pressure or with fluid outlet means through the intermediary of control valve means which is disposed within the power piston. An input shaft is slidably disposed within the power piston and has an engagement portion formed thereon including a first surface area and a second surface area. The first surface area is adapted to engage a detent means connected to the power piston, and the second surface area is adapted to engage stopper means fixedly disposed within said housing. The first and second surface areas are disposed substantially in a common plane.

In the hydraulic pressure booster based on this invention, the stopper means directly abuts the input shaft when it is not operated and the input shaft is maintained at the preset advanced position separated from the detent in relation to the power piston. For this reason, the input shaft and the control valve are very close to each other when the input shaft is not operated.

The control valve means of the invention includes a supply valve and a drain valve. When operation of the device is started, the input shaft advances into the power piston and immediately closes the drain valve and opens the supply valve. As a result, fluid pressure is rapidly supplied to the main power chamber and the power piston is quickly operated.

When operation of the booster is stopped, the input shaft retracts relative to the power piston until the engagement portion thereof engages the detent secured to the power piston. When the engagement portion of the input shaft contacts the detent, the input shaft has retracted to the maximum extent in relation to the power piston. Accordingly, the drain valve is opened to its maximum extent at this time and the supply valve is closed. Therefore, the power piston returns quickly because the fluid in the main power chamber is rapidly discharged therefrom.

When the input shaft is in the non-operated position, it is maintained by the stopper means at the preset advanced position in relation to the power piston. In such condition, the input shaft is separated from the detent.

This makes it possible to reduce the loss stroke of the input shaft in the initial stage of the operation, and the hydraulic pressure booster provides better responsiveness.

The detent does not exert any action on the stopper means. Therefore, the detent is securely attached on the power piston, and it can provide a better detent function for the input shaft.

The surface area of the engagement portion of the input shaft which contacts the detent and the surface area of the engagement portion which contacts the stopper means are disposed in substantially the same plane, and accordingly, dimensional errors are very unlikely to occur. Accurate dimensional control is thereby obtained. Since the control valve means is disposed within the power piston, a portion of the pressure fluid flows between the outer periphery of the stopper means and the inner periphery of the power piston. There is no flow of pressure fluid on the outer periphery of the input shaft. Accordingly, high pressure is not applied to the sealing means for the input shaft, and resistance of the sealing means to sliding movement of the input shaft is not increased. As a result, the input shaft can move smoothly.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWING

The drawing shows a longitudinal sectional view of an embodiment of the hydraulic pressure booster according to the present invention when it is applied in a brake booster.

DESCRIPTION OF PREFERRED EMBODIMENT

In the following, an embodiment of the present invention will be described in conjunction with the drawing.

As shown in the drawing, the brake booster 1 is provided with a housing 2 formed approximately in cylindrical shape. In the housing 2, a first bore 3 and a second bore 4 opened to the right end and the left end of the housing 2 are provided, and a third bore 5 is coaxially furnished and is communicating said first bore 3 and said second bore 4. The diameter of said second bore 4 is larger than that of the third bore 5. A power piston 6 is disposed in the second bore 4 and the third bore 5. The power piston 6 is provided with a first piston portion 7, sliding within the third bore 5 in liquid-tight manner and with a second piston portion 8 having larger diameter than that of the first piston portion 7 and sliding within the second bore 4 in liquid-tight manner. Also, on the power piston 6, a fourth bore 9 and a fifth bore 10 open to the left end and the right end respectively and a sixth bore 11 communicating these bores 9 and 10 are provided in coaxial manner.

At the right end of the housing 2, a plug 12 is provided, which blocks the first bore 3 in liquid-tight manner. The intermediate portion 13 of the plug 12 is engaged in the third bore 5 in liquid-tight manner, and the left end 14 of the plug 12 is protruding in the fourth bore 9 of the power piston 6. A main power chamber 15 based on the present invention is formed between the plug 12 and the power piston 6.

On the plug 12, a seventh bore 16 is formed coaxially with the above sixth bores. In this seventh bore 16, an input shaft 17 is engaged slidably in liquid-tight manner. At the left end of the input shaft 17, a flange portion 18 is formed. When the input shaft 17 moves backward, i.e. when its moves rightward in the drawing, the right surface of the flange portion 18 abutts the left end of the plug 12, and the input shaft 17 cannot be moved rightward further. This position is the retreating limit of the input shaft 17. The flange portion 18 is placed between the stepped portion 19 (located between the fourth bore 9 and the sixth bore 11) and a ring-shaped detent 20 mounted on the power piston 6. When the input shaft 17 is moved rightward in relation to the power piston 6, the input shaft 17 is prevented from the withdrawal from the power piston 6 since the flange portion 18 abuts the detent 20. Specifically, the engagement portion according to the present invention comprises flange portion 18. The right hand surface of this flange portion is contacted by the left hand end surface of the stopper and is also contacted by the detent 20. The radially inner surface area of the flange portion engages the stopper, while the radially outer surface area of the flange engages the detent. These surface areas are disposed substantially in the same plane. Consequently, the flange portion 18 can be relatively moved in relation to the power piston 6 between the stepped portion 19 and the detent 20. Further, a cylindrical member 21 is provided at the left end of the input shaft 17. On the other hand, the right end of the input shaft 17 is connected with the brake pedal (not shown) through a connecting member 22.

Approximately at the center of the input shaft 17, an axial passage 24 communicating with a bore 23 of the cylindrical member 21 is formed, and a radial passage 25 communicating to the right end of the passage 24 is formed. The passage 25 is communicating with an annular groove 26 formed on the plug 12, and the annular groove 26 is communicating with an annular chamber 28, located between the housing 2 and the plug 12, through a radial passage 27 formed on the plug 12. Further, the annular chamber 28 is communicating with the reservoir 31 through the outlet 29 formed on the housing 2 and the discharge pipe 30. Therefore, low pressure prevails in the annular groove 26 and sliding resistance of the input shaft 17 within the sealing means associated therewith is low. As a result, the input shaft slides smoothly.

On the sixth bore 11 of the power piston 6, a valve member 33 equipped with a ball 32 at its right end is movably disposed. On the right end of the sixth bore 11, a cylindrical valve seat 34 is furnished. The ball 32 of the valve member 33 is to be seated on this valve seat 34 by the force of the compression coil spring 35. A pressure chamber 37 is formed by the sealing unit of ball 32 and the valve seat 34 and by the sealing member 36 to seal the valve disc 33. Further, the left end of the cylindrical member 21 is placed face-to-face with the ball 32 in the bore 38 of the valve seat 34.

A compression coil spring 39 is located between the cylindrical member 21 and the valve seat 34. This spring 39 urges the input shaft 17 and the cylindrical member 21 toward the right direction, i.e. toward the direction, by which the cylindrical member 21 is separated from the valve member 33. When a leftward force not big enough to overcome the force of the spring 39 is not applied on the input shaft 17, the input shaft is maintained at the retreating limit position. When the input shaft 17 is moved leftward, i.e. moved forward in relation to power piston 6 against the force of the spring 39, the bore 23 is closed as the left end of the cylindrical member 21 touches the ball 32, and the communication between main power chamber 15 and the reservoir 31 is interrupted. When the input shaft 17 moves leftward, the valve member 33 is also moved leftward, and the pressure chamber 37 and the main power chamber 15 are communicated with each other as the ball 32 is separated from the valve seat 34. Specifically, the control valve 40 consists of the cylindrical member 21, the valve member 33 equipped with the ball 32, and the valve seat 34.

The supply valve comprises the ball 32 and the valve seat 34, and the drain valve comprises the ball 32 and cylinder 21 having bore 23 formed therethrough. When the booster is not operating, the ball 32 contacts the valve seat 34 and the supply valve is closed. When the cylindrical member 21 is separated from the ball 32, the drain valve is opened. When in operation, the cylindrical member 21 contacts the ball 32 and the drain valve is closed. When the ball is separated from the valve seat 34, the supply valve is opened.

In the fifth bore 10 of the power piston 6, the right end of the output shaft 42 is mounted by a ring-shaped detent 43 on the power piston through the ring-shaped spacer 41. The output shaft 42 operates the piston of the brake master cylinder, not shown, on the left end of the housing 2. By the compression coil spring 46, located between the plug 44 screwed with the housing 2 and the stepped portion 45 formed on the right end of the output shaft 42, the output shaft 42 and the power piston 6 are constantly urged toward the right. Unless a leftward force big enough to overcome the force of the spring 46 is applied on the power piston 6, the right end of the power piston 6 abuts the plug 12, and the power piston 6 is maintained at the retreating limit.

When both the power piston 6 and the input shaft 17 are at the retreating limit, the flange portion 18 is maintained between the stepped portion 19 and the detent 20 and is at the position separated from them. When the input shaft 17 is not in operation, the input shaft 17 is maintained at the preset advanced position separated from the detent 20 in relation to the power piston 6 as the flange portion 18 abuts the left end of the plug 12. The left end of the plug 12 constitutes the stopper means of the present invention. At the position where the input shaft is maintained, the left end of the cylindrical member 21 on the left end of the input shaft 17 is located very close to the ball 32.

A chamber 47 is formed between the power piston 6 and the output shaft 42 by the spacer 41. This chamber 47 is communicating with the main power chamber 15 through the passage 69 formed on the power piston 6. Also, the left end of the valve member 33 appears in the chamber 47. On the other hand, an auxiliary power chamber 48 is formed between the housing 2 of the second bore 4 and the power piston 6.

The pressure chamber 37 is communicating with an annular groove 50, formed on the outer periphery of the power piston 6 between the first piston portion 7 and the second piston portion 8 through a passage 49. Also, the groove 50 is communicating with the supply port 53 through the hole 51 formed on the housing 2 and through the filter 52. The supply port 53 is communicating with the discharge side of the pump 56 and the accumulator 55 through the supply pipe 54, and the suction side of the pump 56 is communicating with the reservoir 31. The pump 56 and the accumulator 55 constitute the hydraulic pressure source based on this invention. Between the accumulator 55 and the pump 56, a check valve 57 is furnished, which allows the liquid to flow from the pump 56 to the accumulator 55 but prevents the liquid to flow in reverse direction.

Further, a first connection port 58 communicating with the main power chamber 15 and a second connection port 59 communicating with the auxiliary power chamber 48 are provided on the housing 2. The first connection port 58 is connected with the first port 61a of the 3-port 2-position selector valve 61 through the pipe 60. The second port 61b of the selector valve 61 is connected with the upstream side of the orifice 62 through the pipe 60a.

The third port 61c of the selector valve 61 is connected with the input port 64 of the pressure regulating valve 63 through the pipe 60b. The output port 65 of the pressure regulating valve 63 is connected with the upstream side of the orifice 62 through the pipe 60b. This pressure regulating valve 63 outputs the pressure by reducing it at the predetermined reduction ratio.

Consequently, at the first position I of the selector valve 61 as shown in the drawing, the first connection port 58 is directly connected with the orifice 62. When the selector valve 61 is switched over to the second position II, the first connection port 58 is connected with the orifice 62 through the pressure regulating valve 63. The downstream side of the orifice 62 is connected with the second connection port 59.

A check valve 66 is placed in parallel with the orifice 62. This check valve 66 allows the liquid to flow from the second connection port 59 toward the first connection port 58 but prevents it to flow in reverse direction. Also, hydraulic pressure absorber 67 is furnished between the orifice 62 and the second connection port 59. Further, the second connection port 59 is connected with the reservoir 31 through the check valve 68. The check valve 68 allows the liquid to flow from the reservoir 31 toward the second connection port 59 but prevents it to flow in reverse direction.

Next, description is given on the operation of this embodiment.

The pump 56 is driven, and the operating fluid is introduced into the accumulator 55 from the reservoir 31 through the check valve 57, and it is further sent to the pressure chamber 37 through supply pipe 54, supply port 53, filter 52, passage 51, groove 50 and passage 49. A constant fluid pressure is maintained in the pressure chamber 37 and the accumulator 55 at all times.

First, the selector valve 61 is set to the first position I. Consequently, the first connection port 58 is directly connected with the orifice 62.

When the brake is not operated, the brake booster 1 is in the condition as shown in the drawing. That is, input shaft 17, power piston 6 and output shaft 42 are all located at the retreating limit position. Under this condition, the ball 32 of the control valve 40 is seated on the valve seat 34, and the cylindrical member 21 is separated from the ball 32. For this reason, main power chamber 15 is interrupted from the pressure chamber 37, and it is communicated with the reservoir 31 through the bore 23, passage 24, passage 25, annular groove 26, passage 27, annular chamber 28, discharge outlet 29 and discharge pipe 30. Therefore, the fluid pressure inside the main power chamber 15 is nearly zero.

When the brake pedal (not shown) is depressed for braking purpose, input shaft 17 moves leftward, and the tip of the cylindrical member 21 touches the ball 32. Because the tip of the cylindrical member 21 is located very close to the ball 32 when input shaft 17 is at the retreating limit in this case, the tip immediately touches the ball 32, and the bore 23 of the cylindrical member 21 is closed by the ball 32, thereby closing the drain valve. Thus, the communication of the main power chamber 15 with the reservoir 31 is interrupted. Consequently, the loss stroke of input shaft 17 is reduced.

When input shaft 17 moves leftward, the ball 32 is separated from the valve seat 34 thereby opening the supply valve, and the pressure fluid in the pressure chamber 37 is sent into the main power chamber 15. Fluid under pressure passes from pressure chamber 37 to the gap between the ball 32 and valve seat 34, through the space between the outer peripheral surface of the cylindrical member 21 and the inner surface of the bore through the valve seat 34, through the space between the stepped portion of power piston 6 and the left hand end of the input shaft, the space between the outer peripheral surface of flange 20 of the input shaft and the inner peripheral surface of the fourth bore 9 of the power piston, and through the cylindrical space between the outer peripheral surface of the plug 12 and the inner peripheral surface of the fourth bore 9 of the power piston 6. At this point in the operation of the booster, the power piston 6 has been moved to the left from the position shown in the drawing. By this pressure fluid, the power piston 6 moves forward against the resilient force of the spring 46, and output shaft 42 operates the piston of master cylinder. Thus, braking operation is performed. In this case, negative pressure tends to occur in the auxiliary power chamber 48 as the second piston portion 8 is moved, but negative pressure never occurs in the auxiliary power chamber 48 because the operating fluid under atmospheric condition is sucked from the reservoir 31 through check valve 68. Accordingly, the power piston 6 moves smoothly without resistance. Because the fluid pressure inside the main power chamber 15 also acts upon the input shaft 17, the force applied on the input shaft 17 by fluid pressure is transmitted to the operator as the reaction force of the brake. As the power piston 6 is moved, the valve seat 34 is also moved leftward. When the valve seat 34 touches the ball 32, the communication of the pressure chamber 37 with main power chamber 15 is interrupted. For this reason, the pressure fluid is no longer sent into the main power chamber 15, and the power piston 6 stops to move. As the result, the pressure fluid is sent into the main power chamber 15 according to the degree of the brake pedal force, i.e. according to the input force of the input shaft 17. Therefore, the output force of the output shaft 42 is determined depending upon the input force of the input shaft 17.

Also, the pressure fluid inside the main power chamber 15 is also present in chamber 47 through passage 69. Because the fluid pressure in the chamber 47 acts upon the left end of valve member 33, the force applied on the valve member 33 is cancelled by the fluid pressure in the main power chamber 15, and it is not moved leftward. Thus, there is no need to increase the resilient force of the spring 35.

Meanwhile, the fluid pressure in the main power chamber 15 is also introduced into the auxiliary power chamber 48 from the first connection port 58 through pipe 60, selector valve 61, orifice 62 and the second connection port 59. In this case, the pressure fluid passing through the orifice 62 tends to flow toward the reservoir 31 but it is hindered by the check valve 68. Thus, the pressure fluid is sent only into the auxiliary power chamber 48. The pressure in the auxiliary power chamber 48 is increased with some delay from the increase of pressure in the main power chamber 15 because the pressure fluid is throttled by the orifice 62 and the pressure is absorbed by the fluid pressure absorber 67. Therefore, when the input of the input shaft 17 is stopped at the intermediate loading point and the valve seat 34 touches the ball 32, the pressure in the main power chamber 15 stops to increase. However, since the pressure in the auxiliary power chamber 48 increases with some delay, the output force of the output shaft 42 is increased further even when the input force of the input shaft 17 is stopped, and the braking power is also gradually increased by the preset quantity. In other words, the delayed braking operation is performed.

When brake pedal is released to cancel the braking operation, the input shaft 17 retreats extensively until the flange portion 18 abuts the detent 20 in relation to the power piston 6. For this reason, the left end of the cylindrical member 21 is separated from the ball 32, and the main power chamber 15 is communicated with the reservoir 31, and the pressure is decreased. Therefore, the power piston 6 retreats by the resilient force of the spring 46, and the pressure fluid in the main power chamber 15 is discharged into the reservoir 31 accordingly. The pressure fluid in the auxiliary power chamber 48 is also discharged to the reservoir 31 through check valve 66, selector valve 61 and main power chamber 15. In this case, the pressure fluid in the auxiliary power chamber 48 flows mainly through check valve 66 and is not influenced by the orifice 62. Moreover, the pressure fluid in the main power chamber 15 is discharged quickly to the reservoir 31 because the cylindrical member 21 is widely separated from the ball 32 and the passage with larger area is formed. Therefore, the power piston 6 quickly moves backward.

When the flange portion 18 abuts the left end of the plug 12, the input shaft 17 no longer moves further, and only the power piston 6 retreats. For this sake, the flange portion 18 is separated from the detent 20. The power piston 6 stops to move backward and remains at the retreating limit position when its right end abuts the plug 12.

Under such conditions, the input shaft is located at the preset advanced position in relation to the power piston 6, and the cylindrical member 21 stands very close to the ball 32.

Next, when the selector valve 61 is switched over to the second position II, the first connection port 58 is connected with the orifice 62 through the pressure regulating valve 63.

Regardless of whether the position of the selector valve 61 is set at the position I or position II, the pressure increase within the auxiliary power chamber 48 is time-delayed compared to the pressure increase in the main chamber 15 by the orifice 62. The only difference is that the maximum pressure in the auxiliary power chamber is lower than the pressure in the main power chamber when the changeover valve 61 is set at position II.

When brake is operated and pressure fluid is introduced into the main power chamber 15, the pressure fluid is also sent into the auxiliary power chamber 48 through the pressure regulating valve 63 and the orifice 62. In this case, the pressure increase in the auxiliary power chamber 48 is delayed from the pressure increase in the main power chamber 15 because of the orifice 62. Also, the fluid pressure in the auxiliary power chamber 48 is transmitted at the predetermined pressure reduction ratio by the pressure regulating valve 63 from the fluid pressure in the main pressure chamber 15. Thus, the maximum pressure introduced into the auxiliary power chamber 48 is smaller than the maximum pressure when selector valve 61 is at the first position I.

Therefore, the deceleration of the vehicle is not increased to the deceleration at the time when selector valve 61 is set to the first position I. Accordingly, the final deceleration of the vehicle is changed by the pressure regulating valve 63.

In the embodiment as described above, the stopper means are formed by the left end of the plug 12, but the present invention is not limited to this, and it is possible to form the stopper means by the material other than the plug 12.

Also, explanation was given on the brake booster with delay action in the above embodiment, but the present invention can be applied to normal brake booster without delay action, i.e. without the second piston portion 8 and auxiliary power chamber 48. Further, this invention can also be applied to the hydraulic pressure booster other than the brake booster, e.g. clutch booster, etc.

As it is evident from the above description, the hydraulic pressure booster according to the present invention is provided with a stopper means, which maintains the input shaft at the predetermined advanced position separated from the detent in relation to the power piston equipped with control valve which touches the input shaft when input shaft is not operated, and it is possible to keep the input shaft very close to the control valve when it is not operated. Therefore, when input shaft is operated, control valve can be switched over immediately, and this reduces the loss stroke of the input shaft in the initial stage of the operation.

Because input shaft is directly maintained at the advanced position by the stopper means, the stopper means exerts no action on the detent, and the detent can function to the full extent. At the same time, this eliminates the complicated structure and also contributes to the production of the equipment at low cost.

What we claim is:

1. A hydraulic pressure booster comprising a housing having bore means formed therein, a power piston slidably disposed within said bore means, an output shaft operatively connected to said power piston, a main power chamber for applying fluid pressure to said power piston to move the power piston in a particular direction within said bore means, a source of fluid pressure operatively connected to said main power chamber, fluid outlet means for discharging fluid from said main power chamber, an input shaft slidably disposed within said power piston for advancing and retracting movement therein and for movement relative thereto, said advancing movement being in said particular direction, control valve means disposed within said power piston for controlling the application of fluid pressure to said main power chamber from said source and for controlling discharge of fluid from said power chamber through said outlet means, said control valve means being responsive to advancing movement of said input shaft for applying fluid pressure to said main power chamber and being responsive to retracting movement of said input shaft for discharging fluid from said main power chamber, detect means connected to said power piston, stopper means fixedly disposed within said bore means, said input shaft having an engagement portion supported thereon, said engagement portion including a first surface area for engaging said detent means to limit retracting movement of said input shaft relative to said power piston, said engagement portion including a second surface area for engaging said stopper means to maintain said input shaft in a predetermined advanced position with said first area spaced from said detent means when said input shaft is in its fully retracted position and when the booster is not in operation, said first and second surface areas being substantially disposed in a common plane, said input shaft being slidably supported by said stopper means, sealing means for sealing between the outer periphery of said input shaft and said stopper means, said control valve means preventing fluid pressure from being applied to said sealing means when the booster is not being operated and said input shaft is in a retracted position.

2. A hydraulic pressure booster as defined in claim 1 wherein said control valve means comprises a supply valve and a drain valve, said supply valve including a resiliently biased ball and a valve seat engageable with one another, said drain valve including said ball and a substantially cylindrical member carried by said input shaft, said ball and said cylindrical member being engageable with one another, said cylindrical member having a longitudinal bore formed therethrough.

3. A hydraulic pressure booster comprising a housing having bore means formed therein, a power piston slidably disposed within said bore means, an output shaft operatively connected to said power piston, a main power chamber for applying fluid pressure to said power piston to move the power piston in a particular direction within said bore means, a source of fluid pressure operatively connected to said main power chamber, fluid outlet means for discharging fluid from said main power chamber, an input shaft slidably disposed within said power piston for advancing and retracting movement therein and for movement relative thereto, said advancing movement being in said particular direction, control valve means disposed within said power piston for controlling the application of fluid pressure to said main power chamber from said source and for controlling discharge of fluid from said power chamber through said outlet means, said control valve means being responsive to advancing movement of said input shaft for applying fluid pressure to said main power chamber and being responsive to retracting movement of said input shaft for discharging fluid from said main power chamber, detent means connected to said power piston, stopper means fixedly disposed within said bore means, said input shaft having an engagement portion supported thereon, said engagement portion including a first surface area for engaging said detent means to limit retracting movement of said input shaft relative to said power piston, said engagement portion including a second surface area for engaging said stopper means to maintain said input shaft in a predetermined advanced position with said first area spaced from said detent means when said input shaft is in its fully retracted position and when the booster is not in operation, said first and second surface areas being substantially disposed in a common plane, an auxiliary power chamber for moving said piston in said particular direction, and means to provide fluid pressure to said auxiliary power chamber in time-delayed relation to the application of fluid pressure to said main power chamber.

* * * * *